United States Patent [19]

Portwood

[11] Patent Number: 5,072,846
[45] Date of Patent: Dec. 17, 1991

[54] UNDERGROUND JUNCTION BOXES

[75] Inventor: Robert W. Portwood, Fleet, United Kingdom

[73] Assignee: Wedge International Limited, Camberley, United Kingdom

[21] Appl. No.: 327,669

[22] Filed: Mar. 23, 1989

[51] Int. Cl.$^5$ .............................................. B65D 87/10
[52] U.S. Cl. ..................... 220/3.3; 220/3.7; 220/3.94; 220/4.02; 220/4.03; 220/8
[58] Field of Search ............ 220/18, 1 B, 85 P, 85 S, 220/85 T, 8, 4.01, 4.02, 4.03, 3.3, 3.7, 3.8, 3.92, 3.94

[56] References Cited

U.S. PATENT DOCUMENTS

| | | | |
|---|---|---|---|
| 3,179,278 | 4/1965 | Cohen | 220/8 |
| 3,662,918 | 5/1972 | Crawford et al. | 220/5 A |
| 3,674,169 | 7/1972 | Miller | 220/8 |
| 4,230,234 | 10/1980 | Taylor | 220/8 |
| 4,527,708 | 7/1985 | Dundas et al. | 220/85 S |

*Primary Examiner*—Joseph Man-Fu Moy
*Attorney, Agent, or Firm*—Lowe, Price, LeBlanc & Becker

[57] ABSTRACT

An underground junction box for cables, etc. includes a main body 10 and a head portion 20 with a sleeve 21 which slides within a throat 11 of the main body. Main body 10 is mounted on a concrete base in a hole and both parts are invested with earth or concrete, the top rim 25 of the head portion being level with the ground surface and a cover resting on seat 23. If the lower surface level is changed, the head portion is removed and reset, with an extra fillet of concrete to raise it or fins 27 are cut back to lower it. The main body has a flare 13. A set of boxes may be made with the wide end of the main body of each matching the narrow end of the main body of the next one up in size.

22 Claims, 2 Drawing Sheets

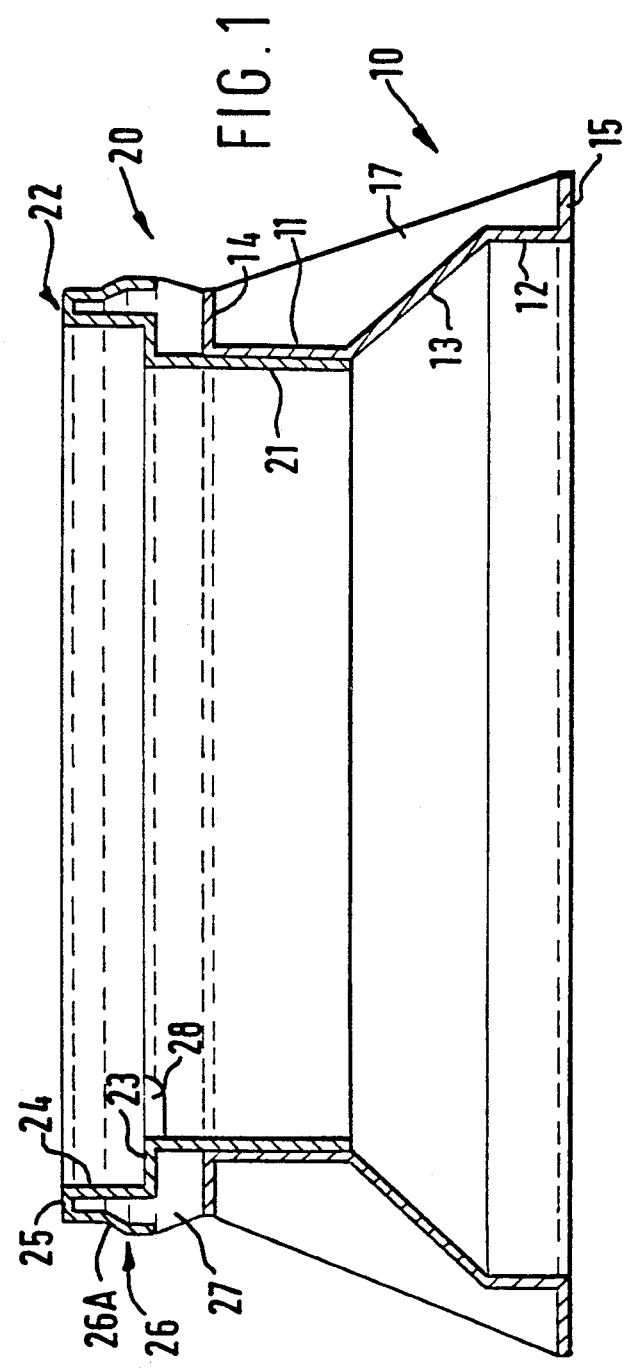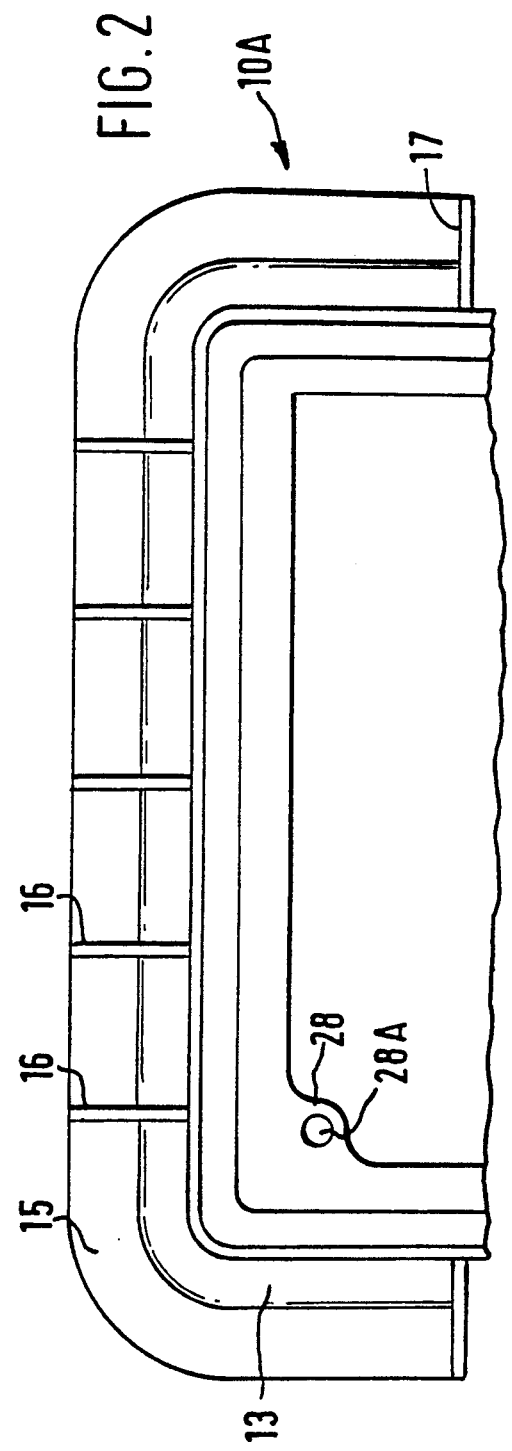

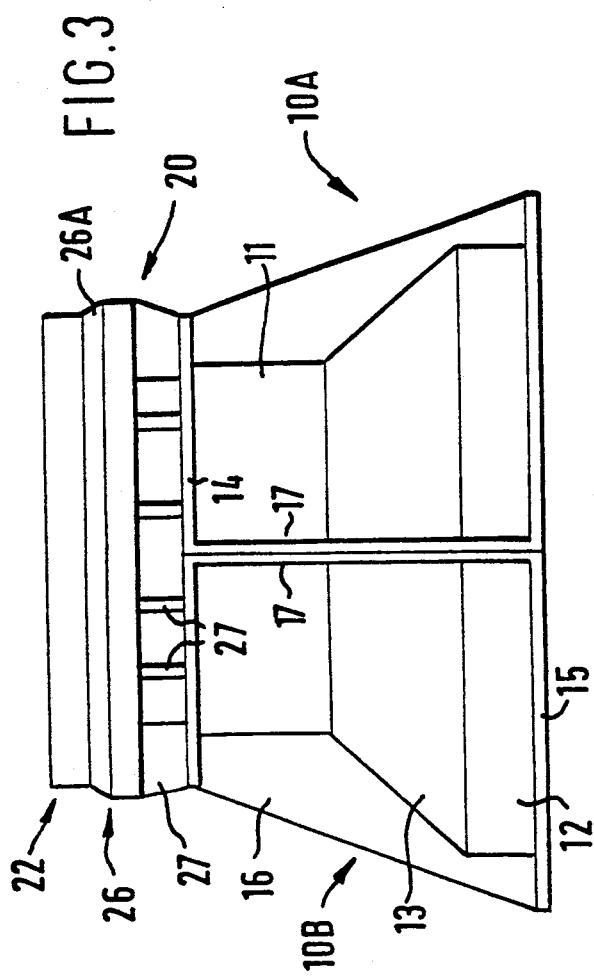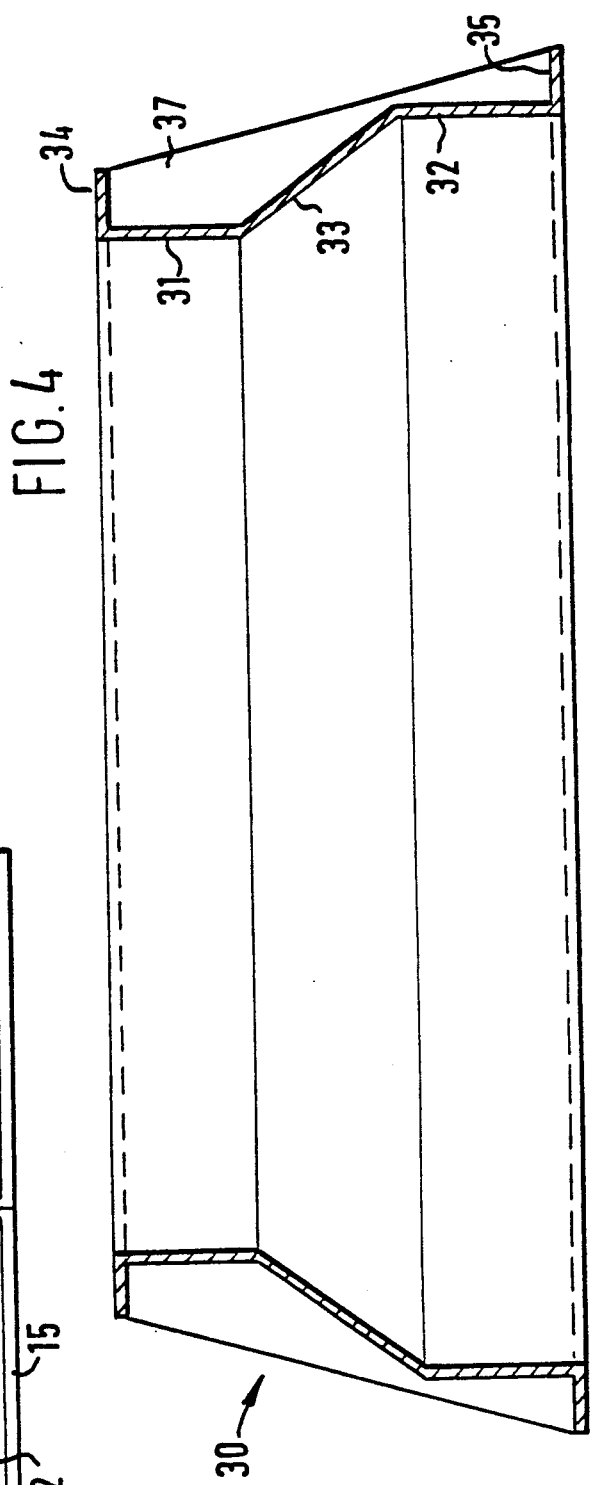

UNDERGROUND JUNCTION BOXES

BACKGROUND OF THE INVENTION

1. Field of the Invention

The present invention relates to underground junction boxes.

2. Description of the Prior Art

There are many forms of public utility and other cabling in which cables are run underground between a variety of buildings. Such cables may be, for example, power cables, telephone cables, and TV cables; in the case of signal cables, the cables may be electrical or fibre optic cables. Access to such cables is required at suitable intervals, and is generally provided by means of underground junction boxes. Such boxes have dimensions of the order of a meter, and are buried so that their upper face is flush with the ground surface. Their upper face consists of a removable plate, allowing access to the cables in the box.

Such boxes are naturally used most frequently in locations where there is a lot of traffic, foot or vehicular, and the ground surface is therefore usually metalled.

Over the course of time, such metalled surfaces become worn. The primary effect of such wear is a change of the character of the surface metalling, usually resulting in increased slipperiness. As time goes on, such surfaces also suffer localized damage, often as a result of particular parts being dug up. Such surfaces therefore require periodic resurfacing. It is very expensive to remove the existing surface, and it is therefore common for such resurfacing to consist of laying a fresh layer of metalling on top of the existing surface. This results in the level of the surface being raised.

A problem thus arises with buried junction boxes, because their top surface has to be raised to the new surface level. If the box is constructed of brick, then there will be a frame mounted on the top of the brick courses, and this frame has to be removed, the top course of bricks has to be raised (e.g. by adding a fillet of concrete round it), and the frame rebedded.

Junction boxes are often now constructed of plastic material. These present a more difficult problem when their top surface has to be raised, because the box is generally an integral structure. It is generally necessary for a separate frame to be mounted on the top of the box and for the top rim of the box to be cut off to make room for the additional frame, or alternatively for the complete box to be reinvested (that is, removed and replaced at its new level). These procedures are inconvenient and costly.

A major purpose of the present invention is to provide an improved junction box in which this problem is alleviated or overcome.

Junction boxes are required in a wide variety of situations. Thus the number of cables entering a box may vary widely, the required depth may vary (or if the cables are already be in situ, their depth may vary), the minimum bending radius of the cables may vary, the space available for accommodating the box may be constrained, and so on. Hence a single box design is not suitable for all situations; to cope with an adequate range of situations, the box size must be variable in both area and depth.

A further object of the present invention is to provide a box design principle which provides such variability with a minimum number of components.

BRIEF SUMMARY OF THE INVENTION

According to one aspect the present invention provides a junction box, for burial with its top surface flush with the ground, consisting of a head portion and a main body. The two portions are both formed of structural plastic materials.

The head portion comprises a sleeve attached at its upper end to a frame for supporting a cover. The frame consists of a seat surrounded by a rim with an inverted U section, with vertical fins formed in a U section and extending downwards beyond the rim lower outer edge to part way down the outside of the sleeve. The fins provide an initial location for the head portion relative to the main body, from which the head portion may be raised by inserting a supporting fillet on the flange of the main body, or lowered by cutting away the fins where they extend below rim lower outer edge.

The main body has its upper part formed by a parallel-sided throat within which the inner sleeve of the head is slidable, and has an outward flange around its upper edge.

According to another aspect of the invention, the main body has an expansion region below the throat so that the bottom is larger than the throat. When the box is buried, it tends to rise or float upwards, because it is hollow and therefore much lighter than the surrounding earth. Some of the investing material (earth or concrete) will however lie over the outside of the expansion region and thus hold the box in position.

The main body is open at the bottom and provided with an outer flange around the bottom. The main body has strengthening fins formed around its sides and in contact with the bottom outer flange, with a spacing slightly larger than the maximum standard cable size.

A range of boxes of graded sizes is provided such that the upper flange of the body of each size matches the lower flange of the next size down. This allows the bodies to be stacked to any desired depth, and the area of the cavity formed by them to be maintained substantially constant (by using the same size in alternately upright and inverted positions throughout the stack) or increased or decreased with depth (by using successively larger sizes in the upright position or successively smaller sizes in the inverted position).

BRIEF DESCRIPTION OF DRAWINGS

A set of junction boxes in accordance with the invention will now be described, by way of example, with reference to the drawings, in which:

FIG. 1 is a vertical section through a box;
FIG. 2 is a plan view of half of the box of FIG. 1;
FIG. 3 is an end view of the box of FIG. 1; and
FIG. 4 is a vertical section through the main body of a larger box.

DETAILED DESCRIPTION OF EMBODIMENTS

Referring to the drawings, a box consists of a main body 10 and a head portion 20. The upper part of the main body 10 is formed as a parallel-sided throat 11 with an outward flange 14 around its upper edge, and the head portion 20 comprises a sleeve portion 21 and a frame 22, the sleeve 21 sliding in the throat 11. The main body 10 and the head portion 20 are both made of plastic materials, and formed by injection moulding.

In more detail, the main body 10 has a lower vertical-sided region 12, and an expansion region 13 formed between the throat 11 and region 12. Outward flanges 14 and 15 are formed around the top and bottom edges respectively. The shape of the main body 10 is broadly rectangular, with the corners (particularly of the region 12 and the lower flange 15) rounded.

The main body 10 is formed from two identical halves 10A and 10B; only half 10A is shown in FIG. 2 while both halves are illustrated in FIG. 3. A plurality of strengthening fins 16 are formed along the long side of each half, as shown in FIG. 2; the mating faces of the halves are formed as similar fins 17. The fins 17 are preferably provided with joining means (not shown) such as bolt holes or interlocking tabs and recesses, so that the two halves can be joined firmly together. The spacing of the fins 16 is chosen to be slightly greater than the maximum expected diameter of the cables to be joined in the box, so that holes may be cut for the cables between the fins; a suitable spacing is 100 mm.

The frame 22 of the head portion 20 comprises a horizontal seat 23, and a rim having an inverted U section and formed by a vertical retaining portion 24, a top horizontal face 25, and an outer skirting 26 with an expansion section 26A as shown. The seating 23 has inwards projections 28 in two diagonally opposite corners with holes 28A. A plurality of fins 27 are provided at intervals around the frame.

In use, a hole is dug to receive the box, and a concrete base is formed at the bottom of the hole. The main body 10, which is open at the bottom, is placed on the concrete base, and the head portion 20 is placed in engagement with the main body. The concrete base is preferably constructed at such a depth below the ground surface that the top horizontal face 25 of frame or rim 22 is level with the ground surface when the bottom edges of the fins 27 rest on the flange 14. A conventional cover (not shown), e.g. of cast iron, is placed in the frame 22 to close the box; this cover can be fixed in position by fixing means (not shown) engaging the holes 28A.

If the box is in a location where only light traffic, e.g. foot traffic, is expected, then the box can be invested with earth. If however heavy traffic, e.g. vehicular traffic, is expected, then the box is invested in concrete of at least 50 mm thickness, to provide greater strength than that of the box itself. It will be noted that the rim 22 of the head portion 20 is hollow, and the concrete preferably fills it to give added strength to the rim. The widening of the rim hollow towards the bottom of skirt 26 assists the entry of concrete into the region between the skirt and retainer 24.

The investing earth or concrete lying over the expansion region 13 and the lower flange 15 of the main body 10 exert a strong influence against possible upwards displacement of the main body.

The fins 27 provide an initial location for the head portion 20 relative to the main body 10. If the ground surface is raised, the head portion 20 may be raised by removing the investing earth or concrete round it, thereby removing head 20 from the main body 10, inserting a supporting fillet of concrete or cement on the flange 14 of the main body 10, re-engaging the head portion 20 with the main body 10 so that the fins 27 rest on that supporting fillet, and reinvesting the head portion with earth or concrete. If the ground surface is lowered, the head portion 20 may be lowered by removing the investing earth or concrete around the head, then by removing the head from the main body 10, cutting off the lower edges of the fins 27, re-engaging the head portion 20 with the main body 10 so that the shortened fins 27 rest on the flange 14, and reinvesting the head portion with earth or concrete.

The fit between the sleeve 21 of the head portion 20 and the throat 11 of the main body 10 is preferably tight enough to minimize the passage of concrete between the sleeve and the throat, but loose enough to allow the head portion to be tilted to a reasonable degree, in case the surface of the ground should become sloping relative to the main body 10.

The dimensions of the box may be chosen to be of any suitable values. For greater flexibility, a range of boxes is preferably produced; a range of three sizes is preferred. For each box size below the largest, the size of the lower flange of its main body is preferably the same as the size of the upper flange 14 of the next box size up. This arrangement means that if a particularly deep junction box is required, then two main bodies of successive sizes can be placed so the smaller box is above the larger box. Alternatively, of course, two identical main bodies can be used, with the lower one inverted. The flanges which may mate together are preferably provided with joining means (not shown) such as bolt holes or interlocking tabs and recesses.

In FIG. 4 is shown the main body 30 of the next size box up from that of FIGS. 1 to 3, to the same scale. The units digits of the reference numerals correspond to those of FIGS. 1 to 3. It will be seen that the upper flange 34 matches the lower flange 15 of the main body 10 of the box of FIGS. 1 to 3.

The main body 30 shown in FIG. 4 has the heights of its throat 31 and its lower vertical-sided region 32 substantially equal. This means that this body can be used in either orientation—as shown or inverted—with an appropriately-sized head portion. If a range of box sizes is provided, then the same principle can be used for all sizes.

I claim:
1. A cable junction box, for burial with its top surface flush with the ground, comprising:
 a main body having at its upper part a parallel-sided throat and an outwardly extending flange; and
 a head portion comprising
 a sleeve slidable within the throat of the main body so that the location of the head portion may be vertically adjusted, and
 a frame for supporting a cover and attached to and extending outwardly from the upper end of the sleeve to form a space between itself and the flange of the throat into which supporting material may be placed when the location of the head portion has been adjusted.

2. A junction box according to claim 1 wherein the two portions are both formed of structural plastic material.

3. A junction box according to claim 1 wherein the frame of the head portion includes a seat surrounded by a rim with an inverted U section.

4. A junction box according to claim 3 wherein the head portion has a plurality of vertical fins formed in the U section and extending downwards beyond the lower outer edge of the rim to part way down the outside of the sleeve.

5. A junction box according to claim 1 wherein the main body has an expansion region below the throat so that the bottom is larger than the throat.

6. A junction box according to claim 5 wherein the main body has an open bottom and an outward flange around its lower edge.

7. A junction box according to claim 6 wherein the main body has a plurality of vertical fins formed around its sides and in contact with the bottom outer flange.

8. A junction box according to claim 7 wherein the spacing of the flanges of the main body is slightly larger than the maximum standard cable size.

9. A set of junction boxes of graded sizes each according to claim 6 wherein the upper flange of the body of each size matches the lower flange of the next size down.

10. A set of junction boxes of graded sizes each including a main body open at top and bottom and having an upper flange to which a frame for supporting a cover may be attached a lower flange, and an expansion region between the top and bottom such that the bottom is larger than the top, the upper flange of the body of each size matching the lower flange of the next size down.

11. A set of junction boxes according to claim 10 wherein the main bodies are reversible bottom to top.

12. An electric cable box adapted to be secured in the earth so that a cover for the box is maintained flush with the ground surface comprising a main body adapted to be inserted into a hole in the ground below the ground surface, the main body constructed to be maintained at a fixed site in the hole below the ground surface, a head fitting into the main body, the head having a top horizontal face and a seat below the face, the seat adapted to receive the cover and maintain the cover flush with the ground surface, the head and main body including structures enabling the head to be initially translated in the vertical direction relative to the main body and to enable the head to be thereafter maintained at a first fixed position so the cover is flush with the ground surface and for enabling the head to be thereafter translated in the vertical direction relative to the main body as the position of the cover relative to the ground surface changes and to enable the head to be thereafter maintained at a second fixed position so the cover is maintained flush with the ground surface.

13. The electric cable box of claim 12 wherein said structures include a sleeve on the head and a throat having an interior wall on the main body, the sleeve having an outer perimeter slightly less than the perimeter of the interior wall so as to minimize the passage of concrete between the sleeve and throat and enable the sleeve to translate in the throat.

14. The electric cable box of claim 13 wherein the fit between the sleeve and throat is such that the head can be tilted to a reasonable degree for ground surfaces that slope relative to the throat axis to enable the cover to be maintained flush with the ground surface.

15. The electric cable box of claim 12 wherein the top horizontal surface is flush with the ground surface and cover.

16. The electric cable box of claim 12 wherein the head includes a skirt downwardly depending from the top horizontal face and extending outwardly from the seat.

17. The electric cable box of claim 16 wherein the skirt includes an expansion section, the expansion section including an outwardly sloping wall segment.

18. The electric cable box of claim 13 wherein the main body includes a flange extending horizontally outwardly from the throat above a bottom of the main body, the head including a member extending outwardly from the sleeve, the member having a planar bottom surface engaging the flange.

19. The electric cable box of claim 18 wherein the member includes plural ribs attached to and extending from the sleeve.

20. The electric cable box of claim 13 wherein the main body includes plural fins attached to and extending outwardly from the throat.

21. The electric cable box of claim 20 wherein the main body includes an expansion region having a sloping wall extending radially outward with respect to the sleeve, a flange at the bottom of the main body, the fins extending between the flange along the expansion region and throat.

22. The electric cable box of claim 21 wherein the main body includes a second flange extending horizontally outwardly from the throat above the bottom of the main body, the head including a member extending outwardly from the sleeve, the member having a planar bottom surface engaging the flange and the fins extending between the second flange and the flange at the bottom of the main body.

* * * * *